Sept. 29, 1936.   G. A. BRAGG   2,056,063
PROCESS OF DEPHENOLIZING AMMONIA LIQUOR
Filed Oct. 20, 1932   2 Sheets-Sheet 1
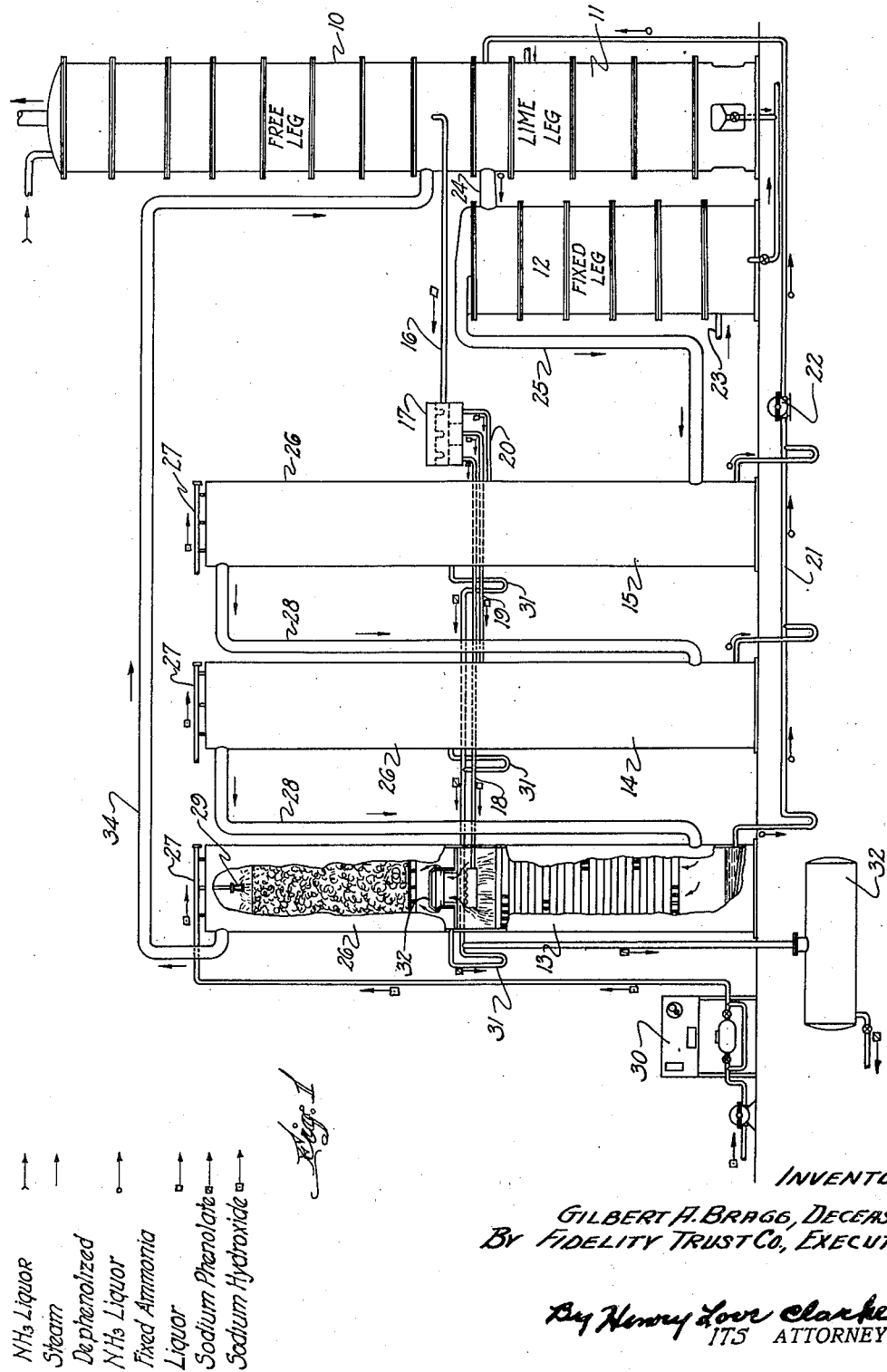
INVENTOR
GILBERT A. BRAGG, DECEASED
By FIDELITY TRUST CO., EXECUTOR
ITS ATTORNEY.

Sept. 29, 1936.  G. A. BRAGG  2,056,063
PROCESS OF DEPHENOLIZING AMMONIA LIQUOR
Filed Oct. 20, 1932  2 Sheets-Sheet 2
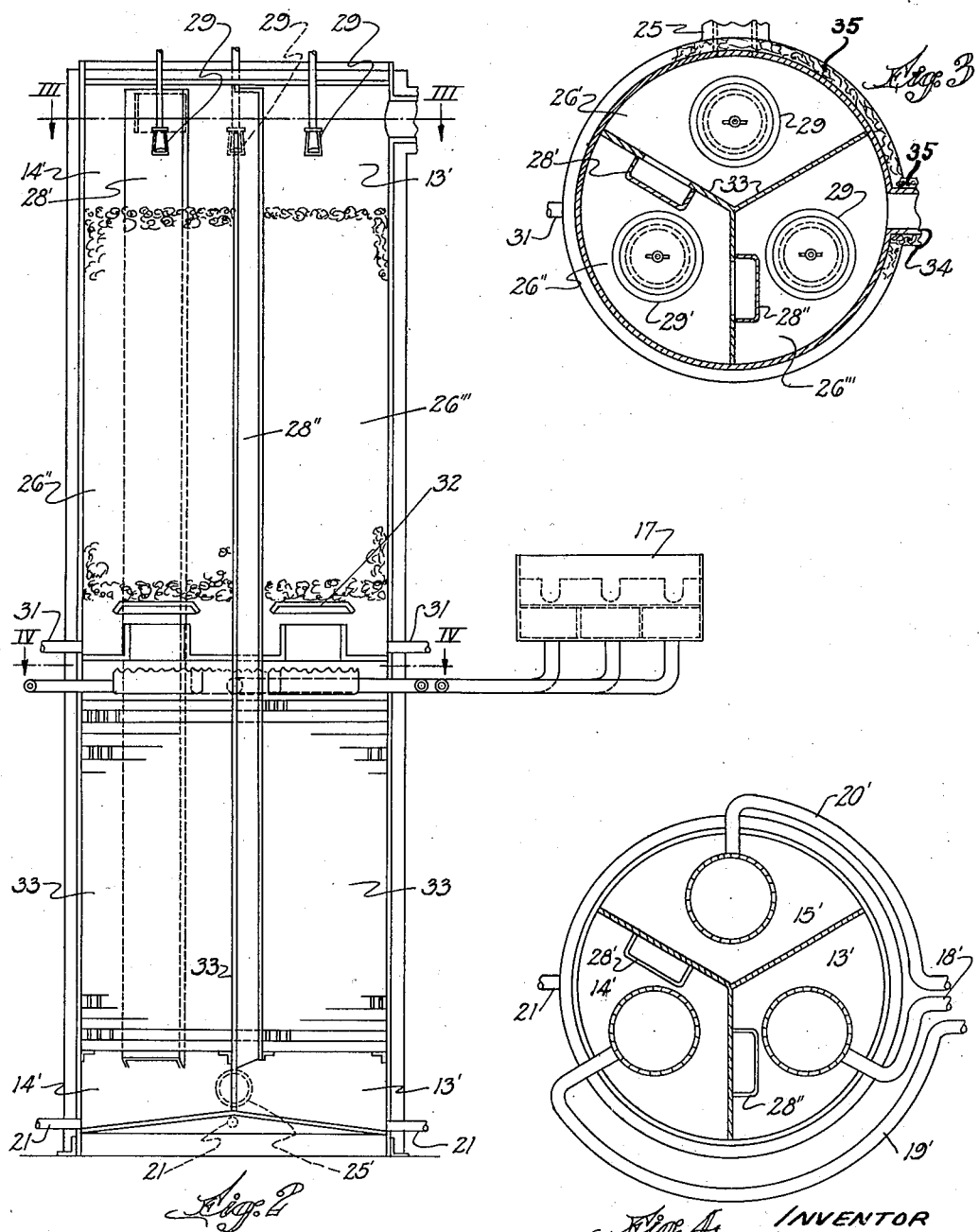
INVENTOR
GILBERT A. BRAGG, DECEASED
BY FIDELITY TRUST CO., EXECUTOR
By Henry Loos Clarke
ITS ATTORNEY.

Patented Sept. 29, 1936

2,056,063

UNITED STATES PATENT OFFICE 2,056,063

PROCESS OF DEPHENOLIZING AMMONIA LIQUOR

Gilbert A. Bragg, deceased, late of Pittsburgh, Pa., by Fidelity Trust Company, executor, Pittsburgh, Pa., assignor to The Koppers Company of Delaware, Pittsburgh, Pa., a corporation of Delaware Application October 20, 1932, Serial No. 638,742

4 Claims. (Cl. 260—154)

This invention relates in general to the treatment of liquids for the separation of constituents thereof or for the removal of volatile impurities therefrom. The invention is of utility in various processes for selective separation of constituents from liquids, but is especially adapted to the dephenolization of ammoniacal gas liquor and other aqueous liquids.

More particularly the present invention relates to improvements in the processes described in the copending applications of Mark Shoeld, Serial No. 386,515, filed August 17, 1929, and Fred Denig, Serial No. 560,542, filed September 1, 1931.

An object of the present invention is to provide an improved method for treating liquids for separation and removal of constituents thereof, and especially to effect dephenolization of ammoniacal gas liquor.

A further object of the present invention is the provision of a method for the above purposes which materially improves the removal efficiency.

The invention further consists in such other new and useful improvements and has for further objects such other operative advantages or results as may be found to obtain in method hereinafter described and claimed.

In the accompanying drawings forming a part of this specification and showing for purposes of exemplification a certain form and manner in which the invention may be embodied and practiced, but without limiting the claimed invention to such illustrative instance or instances:

Fig. 1 is a diagrammatic elevational view of the preferred form of apparatus for practicing the invention, parts being shown in section for clearness of illustration;

Fig. 2 is a vertical sectional view of a modified form of compartmental tower for the absorption and removal steps of the process;

Fig. 3 is a horizontal sectional view taken on the lines 3—3 of Fig. 2; and

Fig. 4 is a similar view taken on the line 4—4 of Fig. 2.

In its present embodiment, the invention is applied to the purification of ammoniacal gas liquor from fuel gases; for convenience, the present description will be confined to this use of the invention. Features of the present invention are, however, readily susceptible of other valuable applications, such as for dephenolizing other liquors, $H_2S$ purification, etc.; consequently the invention in its broader aspects is not confined in its scope to the specific use and embodiment herein described as an illustrative example.

The aforesaid copending application of Mark Shoeld describes a method of and apparatus for treating liquids for the separation of constituents thereof or for the removal of volatile impurities therefrom. In that process a carrier fluid, such as another liquid or preferably a gas, is employed to remove a constituent or impurity from the liquid being treated. The process involves treatment of the liquid with the carrier fluid (e. g., the carrier gas) in a plurality of contact stages, between which stages the carrier gas is treated for the removal of the constituent or impurity absorbed from the liquid before it passes to the next stage.

The process and apparatus described in the aforementioned Shoeld application are applicable to the removal of a wide variety of constituents from a wide variety of liquids, such as the removal of tar acids from ammonia liquor and other aqueous and non-aqueous liquids including tar, the removal of $H_2S$ and/or HCN from water and other liquids, and the removal of certain volatile constituents from gasoline and other petroleum fractions, for example. In one aspect my present invention constitutes an improvement on the Shoeld process which is of especial utility in the dephenolization of ammonia liquor and other liquids containing tar acids.

In the preferred application of the Shoeld process to the dephenolization of ammonia liquor, the liquor is first distilled with steam in the usual manner to remove free ammonia and other constituents. The liquor is then treated with a carrier gas, such as steam, in a plurality of stripping stages to remove tar acids from the liquor, and between the stripping stages the carrier gas is contacted with an absorbent for tar acids, such as caustic soda solution for example.

After leaving the stripping stage the dephenolized liquor is mixed with milk of lime or the like to liberate ammonia which was originally present in fixed form, and it is then subjected to another steam distillation which removes the originally fixed ammonia. The steam supplied to the fixed still and containing ammonia removed from the liquor may pass through the stripping stages and the alternated absorbing stages of the dephenolizer, where it serves as the carrier gas, and then through the free still to remove free ammonia and other volatile constituents from a further quantity of liquor.

In dephenolizing ammonia liquor the stripping and absorbing sections must usually be maintained at a temperature near the boiling point of the liquor, such as 100° to 110° C., for example, if complete removal of tar acids is to be obtained and condensation of steam or ammonia is to be prevented. To this end the towers for the stripping sections and absorption sections and piping are all insulated so that insulation is substantially complete and no substantial loss of heat from the steam occurs in this treatment.

In accordance with the present improvements, instead of passing all of the ammoniacal liquor from the free leg through the series of dephenolization stages in series, the ammonia liquor from the free leg is split in two or more equal streams, each passing to its own ammonia liquor section. The vapor used to absorb the phenols is, however, as in the aforesaid applications, the steam from the fixed leg of the ammonia still. It is used in two or more passes in series before it is introduced into the free leg of the still. After each pass, the phenol content of the vapor is removed by means of a caustic solution in a caustic section. Thus the flow of steam through the split portions of ammonia liquor, from the free leg of the still, is in series but the ammonia liquor flow is in parallel. With this method, substantially complete dephenolization obtains. The per cent of dephenolization depends, with other conditions equal, upon the quantity of steam used per gallon of ammonia liquor. A wide range of this ratio is obtainable by using any pre-determined number of parallel flow ammonia liquor streams.

Referring to Fig. 1, 10 is the free leg; 11 is the lime leg; and 12 is the fixed leg of an ammonia still of usual and well known construction and operation. 13, 14 and 15 are different and individual sections of a dephenolizer. For convenience only a three pas dephenolizer has been illustrated.

Ammonia liquor, after having been freed of $H_2S$ and $CO_2$ and free ammonia by means of steam in the free leg 10, passes out through conduit 16 into a distributing device 17. In the distributor 17, the ammonia liquor is divided into a plurality of, in the present instance three, equal streams which are fed separately to their individual ammonia liquor dephenolizing sections 13, 14 and 15, respectively, by separate conduits 18, 19 and 20. The sections 13, 14 and 15 are preferably packed with wooden hurdles, spiral tile, or other suitable packing for effecting intimate and thorough contact of the steam and ammonia liquor, although bubble cap sections may be employed to advantage.

After passing through their individual dephenolizing sections in parallel the different streams or parts of dephenolized liquor are united in the common offtake conduit 21 and pump by pump 22 into the lime leg 11 of the ammonia still wherein the dephenolized liquor is treated with lime in the usual manner, and thence passes by conduit 24 into the fixed leg 12.

The steam, as is usual, is introduced by pipe 23 into the bottom of the fixed leg 11, carries off the free ammonia, which has been freed from the fixed ammonia compounds in the legs 11 and 12, and passes through conduit 25 into the bottom of the first dephenolizing section 15. Here it passes upwardly through the section countercurrent to the descending split third of ammonia liquor from the still free leg 10 that is to be dephenolized, and completely dephenolizing this portion. From the lower dephenolizing section it passes upwardly through an upper caustic section 26 where the phenol is removed from the steam by a suitable caustic soda solution introduced by conduit 27. The dephenolized steam leaves the caustic section 26 and passes by conduit 28 through the other two sections 14 and 13, in series, in exactly the same manner, each of which is provided with a similar caustic section communicably connected therewith in the same manner as described in connection with section 15, and as shown in connection with the dephenolizing section 13. The caustic sections are packed with steel turnings as shown, and the caustic soda solution is supplied by a shot device 29 through pipes 27 leading to the respective caustic sections from a metered source of supply 30.

After passing through the caustic sections, the caustic is substantially converted to sodium phenolate and overflows from the sodium phenolate wells 31 to the storage tank 32. The caustic is introduced in shots about every ten minutes and in amount proportioned to the phenol to be removed by conversion to sodium phenolate. The ammonia liquor averages three grams per litre of phenol, and a ten per cent caustic solution is satisfactory for the purpose. The amount of ten per cent caustic solution required for each 100 gallons of ammonia liquor is about 1.3 gals. The introduction of caustic solution in shots as aforesaid and the discharge of sodium phenolate through the wells is regulated so that about eighty per cent of the caustic in the solution is converted to sodium phenolate when discharged. The introduction of the caustic solution in shots at intervals as aforesaid is also regulated so that the conversion is substantially completed below the top of the caustic packing, so that the top packing always contains fresh caustic. In this manner steam leaving each caustic section is substantially completely free of phenol before entering a next dephenolizing section, and such steam being free of phenol and being of substantially its original temperature and pressure, due to avoidance of heat loss by reason of the insulation and temperature of the ammonia liquor and caustic solution, is in condition to take up its full quantity of phenol in a next dephenolizing section.

Referring to Figs. 2 and 4, there is disclosed a modified form of apparatus for carrying out the method, in which all three dephenolizing sections and caustic sections are constituted as separate compartments in a single shell. As shown, the interior of the shell is divided by three vertical partitions 33. Steam first enters the shell at 28' passing upwardly through the first section 15', through its upper caustic section 26' therefor, thence through steam downcomer 28' into the bottom of the next dephenolizing section 14', thence passing upwardly therethrough and through the bell 32 through the caustic section 26'' to a second steam downcomer 28'', from whence the dephenolized steam enters the third dephenolizing section 13', and passes similarly therethrough and through its caustic section 26'''.

The entire apparatus is insulated, as shown at 35, to prevent heat losses.

In both embodiments, the steam from the final caustic section is conveyed by conduit 34 to the free leg 10 of the ammonia still. The carrier gas, such as steam, in issuing from the fixed leg 12 of the still carries the free ammonia with it, and in passing through the dephenolizing sections 13, 14 and 15 retains the free ammonia and also takes up any free ammonia in the liquor during dephenolization in the sections 13, 14 and 15. During its passage through the caustic sections 26, the steam gives up its content of phenols but not its content of free ammonia, the latter being carried along by the steam through line 34 to the free leg 10 of the ammonia still where the steam takes up further quantities of free ammonia. Of course other steam may be used for dephenolization, the presence of free ammonia being unnecessary for the purpose. The use of steam from the still however makes it possible to dephenolize without any extra cost for steam. The steam also removes other tar acids which may be present, phenol being used herein as a generic term for carbolic acid, cresols and xylenols.

It has been found in development of this process that three pounds of steam per gallon of ammonia liquor in a counter-current tower results in removal of only about 50 per cent of the total phenol. In a three pass series flow, in which all the phenol was passed through three stages in series countercurrent to all the steam, at 3 pounds, with conversion of the phenol from the steam after each dephenolizing section, the maximum removal of the phenol from the ammonia liquor was 87½ per cent, i. e., 50 per cent of the phenol present in the ammonia liquor in each of the respective successive stages. Consequently the ammonia liquor leaving the third stage still had 12½ per cent of its original phenol content. It was also found that 6 to 9 pounds of steam per gallon of ammonia liquor in one counter-current pass gave substantially complete dephenolization results. But the steam required for the ammonia still is only three pounds to each gallon of ammonia liquor, so that extra steam would be required. This the present arrangement and method saves, since by dividing all of the ammonia liquor into three equal parts for parallel flow and passing all the steam through each one-third there is at any one time one-third of a gallon of ammonia liquor to three pounds of steam, or in effect nine pounds of steam for each gallon of ammonia liquor in each of the dephenolizing sections without any steam in addition to that derived from the ammonia still.

The invention as hereinabove set forth is embodied in particular form and manner but may be variously embodied within the scope of the claims hereinafter made.

What is claimed is:

1. The process of removing tar acid from a liquid containing it comprising: dividing the liquid into separate portions; passing the separate portions through separate treatment stages individual to the separated portions respectively; passing a carrier fluid through the liquids in the separate stages in series and thereby carrying off from the liquids the tar acid to be removed therefrom; and treating the carrier fluid after it leaves each stage and before it enters a next following stage to remove the tar acid carried off by the carrier fluid.

2. The process of removing phenol from ammonia liquor containing it comprising: dividing the ammonia liquor into separate portions; passing the separate portions through separate treatment stages individual to the separated portions respectively; passing a carrier fluid through the ammonia liquor in the separate stages in series and thereby carrying off from the ammonia liquor the phenol to be removed therefrom; and treating the carrier fluid after it leaves each stage and before it enters a next following stage to remove the phenol carried off by the carrier fluid.

3. The process of removing tar acid from ammonia liquor containing it comprising: dividing the ammonia liquor into separate portions; passing the separated portions through separate treatment stages individual to the separated portions respectively; passing steam through ammonia liquor in the separate stages in series and thereby removing from the ammonia liquor the tar acid to be removed therefrom; and treating the tar acid-bearing steam after it leaves each stage and before it enters a next following stage to remove from the steam the tar acid carried off thereby.

4. The process of removing phenol from ammonia liquor containing it comprising: dividing the ammonia liquor into separate portions; passing the separated portions through separate treatment stages individual to the separated portions respectively; passing steam through ammonia liquor in the separate stages in series and thereby removing from the ammonia liquor the phenol to be removed therefrom; and treating the phenol-bearing steam after it leaves each stage and before it enters a next following stage with sodium hydroxide to remove from the steam the phenol carried off thereby.

FIDELITY TRUST COMPANY,
Executor of the Estate of Gilbert A. Bragg, Deceased,
By ALEXANDER P. REED,
Vice President.